Jan. 22, 1946.    F. SCHMIDT    2,393,480
SOLDERING IRON
Filed Feb. 28, 1944
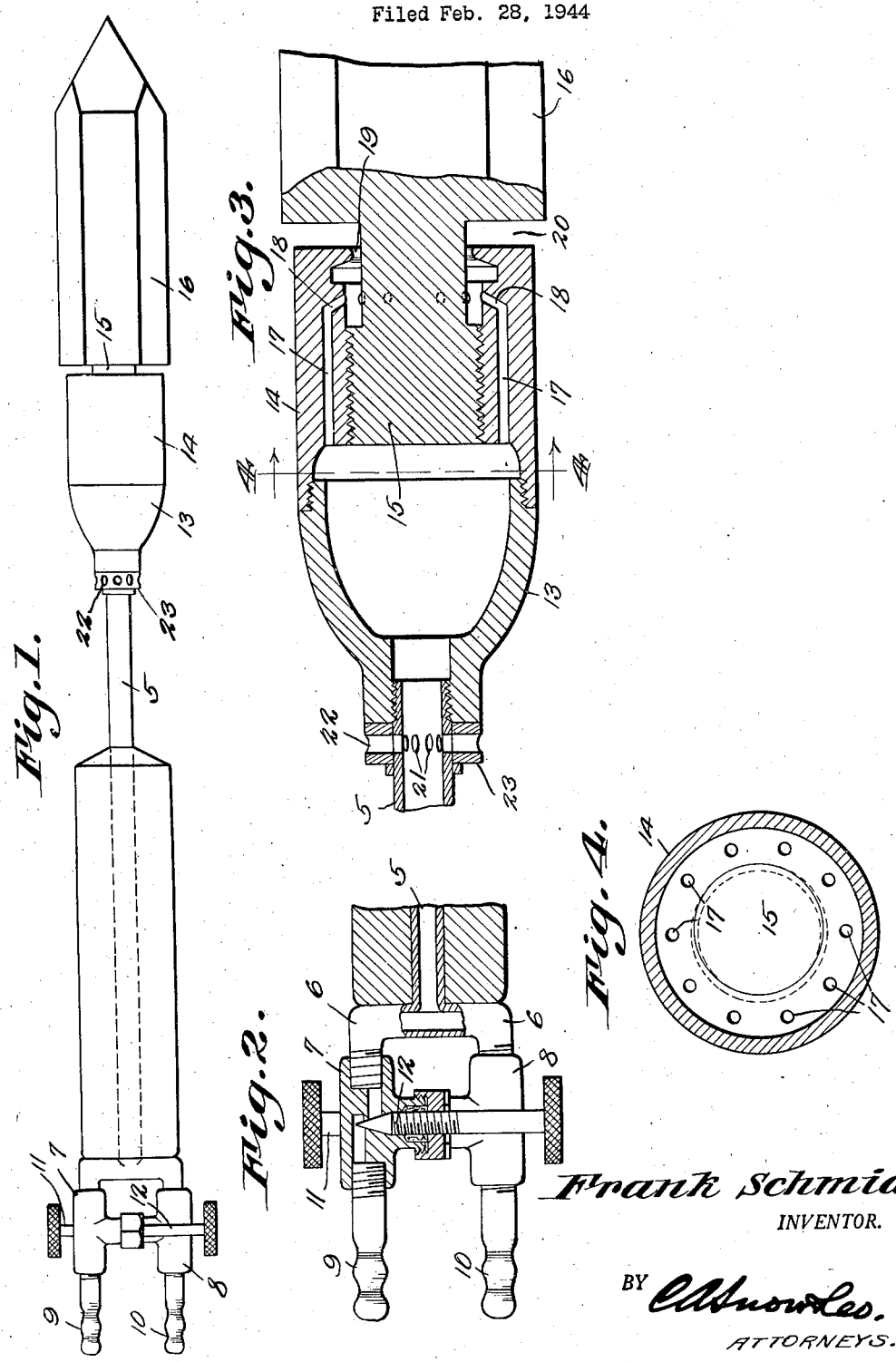
Frank Schmidt
INVENTOR.
BY CMKnowles.
ATTORNEYS.

Patented Jan. 22, 1946

2,393,480

UNITED STATES PATENT OFFICE 2,393,480

SOLDERING IRON

Frank Schmidt, Iola, Wis.

Application February 28, 1944, Serial No. 524,221

2 Claims. (Cl. 158—26)

This invention relates to soldering irons, and more particularly to soldering irons of the liquid or gaseous fuel burning type, the primary object of the invention being to provide a soldering iron wherein the temperature thereof may be readily controlled to maintain the iron at a uniform working temperature, with the minimum amount of fuel.

Another object of the invention is to provide a soldering iron including a combustion chamber, which is so constructed that the heat generated therein will be directed onto the base of the soldering head for radiation to the working end thereof, to the end that the heat of the head is uniform, throughout the length of the head.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a side elevational view of a soldering iron constructed in accordance with the invention.

Figure 2 is a fragmental sectional view illustrating the control valves of the iron.

Figure 3 is a fragmental sectional view through the combustion chamber and means for connecting the soldering head thereto.

Figure 4 is a sectional view taken on line 4—4, Fig. 3.

Referring to the drawing in detail, the soldering iron embodies a pipe 5, which has laterally extended pipe sections 6 that are threaded to receive the valves 7 and 8. Couplings 9 and 10 extend into the valves, and afford means whereby flexible feed pipes may be connected to the valves. The passage of air and gas through the valves is controlled by the valve members 11 and 12. The soldering iron also includes a hollow section 13 that is formed with threads to be fitted on the threaded end of the pipe 5, as clearly shown by Fig. 3 of the drawing.

The outer end of the hollow section 13 is threaded to accommodate the threads of the combustion chamber housing 14 which is also formed with internal threads to accommodate the threads of the extension 15, forming a part of the soldering head 16.

The combustion chamber housing 14 is formed with a plurality of longitudinal bores 17 that have their inner ends communicating with the hollow section 13 so that air and gas entering the hollow section 13, may pass into the bores 17. These bores 17 have their outer ends extended inwardly as at 18, where they direct air and gas into the combustion chamber or annular space formed at the inner end of the soldering iron head.

As clearly shown by Fig. 3 of the drawing, the outer end of the combustion chamber housing 14 extends radially inward towards the extension 15 of the soldering head, leaving a small annular space 19 between the combustion chamber housing 14 and extension 15, so that the heat generated in the combustion chamber, will be directed onto the extension 15, prior to the passage of the heat and products of combustion, from the combustion chamber, through the space 20, to properly heat the soldering head.

The pipe 5 is formed with a plurality of openings 21 that are adapted to register with openings 22 of the ring 23, mounted on the pipe 5. By moving the ring 23, it will be obvious that the quantity of air entering the hollow section 13 and combustion chamber 14, may be regulated.

In the operation of the device, air and gas under pressure, are admitted to the hollow sections of the soldering iron, from where the air and gas pass through the bores, entering the combustion chamber, where the charge is ignited, and the heat from the burning charge is directed to the soldering head, maintaining the soldering head under a predetermined temperature at all times, and eliminating the necessity of reheating the iron by placing it in a burner or similar soldering iron heating device.

What is claimed is:

1. A self-heating soldering iron comprising a hollow open-ended section adapted to be positioned on the threaded end of a fuel supply pipe, a tubular combustion chamber section having internal threads, fitted over the open end of the hollow open-ended sections, forming a mixing chamber therewith, a soldering head including a threaded extension fitted within the tubular combustion chamber section, said extension having a reduced portion providing a combustion space with the inner surface of the combustion chamber section, said combustion chamber section having a plurality of spaced longitudinal bores communicating with the mixing chamber, said bores also having inwardly extended ends adapted to discharge fuel into the combustion chamber where the fuel is ignited, heating the soldering head.

2. A self-heating soldering iron comprising a hollow open-ended section adapted to be positioned over the threaded end of a fuel supply pipe, a tubular combustion chamber section having internal threads, fitted over the open end of the hollow open-ended section, forming a mixing chamber therewith, a soldering head including a threaded extension, fitted within the tubular combustion chamber section, said extension having a reduced portion providing a combustion space with the inner surface of the combustion chamber section, said combustion chamber section having a plurality of spaced longitudinal bores communicating with the mixing chamber, and adapted to discharge fuel into the combustion space where the fuel is ignited, heating the soldering head.

FRANK SCHMIDT.